(12) United States Patent
Timcik et al.

(10) Patent No.: US 7,306,666 B2
(45) Date of Patent: Dec. 11, 2007

(54) ADDITIVES AND METHOD FOR REDUCING ODOR

(75) Inventors: Charles Timcik, Camarillo, CA (US); John Fergeus, Hallam (AU)

(73) Assignee: Odor Management, Inc., Newbury Park, CA (US)

( * ) Notice: Subject to any disclaimer, the term of this patent is extended or adjusted under 35 U.S.C. 154(b) by 0 days.

(21) Appl. No.: 11/370,319

(22) Filed: Mar. 8, 2006

(65) Prior Publication Data

US 2006/0155003 A1 Jul. 13, 2006

Related U.S. Application Data

(63) Continuation of application No. 10/428,233, filed on May 2, 2003, now Pat. No. 7,037,955.

(51) Int. Cl.
| | |
|---|---|
| *C09D 5/00* | (2006.01) |
| *C09D 191/00* | (2006.01) |
| *C09D 195/00* | (2006.01) |
| *C10L 1/19* | (2006.01) |
| *C10M 129/70* | (2006.01) |

(52) U.S. Cl. ............... 106/287.24; 106/273.1; 106/281.1; 106/282; 44/437; 508/577
(58) Field of Classification Search ............... 523/102; 44/437; 508/577; 106/281.1, 273.1, 285, 106/287.24
See application file for complete search history.

(56) References Cited

U.S. PATENT DOCUMENTS

| 5,271,767 A | 12/1993 | Light, Sr. et al. |
| 6,461,421 B1 | 10/2002 | Ronvak et al. |
| 2003/0026823 A1 | 2/2003 | Fried et al. |

OTHER PUBLICATIONS

International Search Report for PCT/US04/13704, Aug. 2006.

*Primary Examiner*—David M Brunsman
(74) *Attorney, Agent, or Firm*—McDonnell Boehnen Hulbert & Berghoff LLP (57) ABSTRACT

Additives and methods for reducing or eliminating odor in oil based media. The additives comprise an essential oil, an essential oil component, or mixtures thereof.

18 Claims, 8 Drawing Sheets

ADDITIVES AND METHOD FOR REDUCING ODOR

This application is a continuation of US 10/428,233, filed 2 May 2003, now U.S. Pat. No. 7,037,955.

BACKGROUND OF THE INVENTION

1. Field of the Invention

This invention relates to additives and methods for reducing odor in oil based media, and to oil based media mixtures having reduced odor.

2. Description of the Related Art

Asphalt, representing one example of oil based media, is an important material for building and repairing roads. It is also used in applications such as roofing and weather sealing. It is well known, however, that hot mix asphalt produces volatile materials such as hydrocarbons, sulfides, and mercaptans, which can have strong, persistent and potentially harmful odors. The odors can cause discomfort to persons working with the hot asphalt, to residents living near areas where asphalt is manufactured or paved and generally to persons who come within close range of the hot asphalt.

Traditional odor treating compositions act as deodorizers or masking agents, essentially overwhelming the undesired odor with another odor. Such techniques, however, are poor at masking strong odors. In addition, masking does not reduce the concentration of the volatiles causing the odors, and therefore is generally ineffective at reducing the harmful effects of the volatiles.

There exists a need, therefore, for new compositions and methods for reducing the odors of oil based media.

BRIEF SUMMARY OF THE INVENTION

The invention provides a method for reducing odor in oil based media, said method comprising mixing an odor reducing amount of an odor reducing additive with the oil based medium, wherein the odor reducing additive is an essential oil, an essential oil component, or mixtures thereof.

The invention also provides mixtures having reduced odor comprising: an oil based medium; and an odor reducing additive, wherein the odor reducing additive is an essential oil, an essential oil component, or mixtures thereof.

DETAILED DESCRIPTION OF THE PREFERRED EMBODIMENT

The invention provides odor reducing additives and methods for reducing odors in oil based media.

The odor reducing additive is one or more essential oils or essential oil components. By "essential oils" is meant natural extracts of various parts of aromatic plants and trees. By "essential oil components" is meant any of the components which make up an essential oil. Examples of such components include, but are not limited to, terpenes, alcohols, aldehydes, aromatics, phenolics, esters, terpene derivatives, non terpene essential oil components, and terpene reactants.

Preferred odor reducing additives are terpenes, or essential oils containing terpenes as components. As used herein, the term "terpenes" encompasses all variations of terpenes and their derivatives, including hydrocarbon terpenes, unsaturated terpenes, oxygen containing terpenes (terpenoids) such as alcohols, aldehydes, ketones, esters, acetates, ketals and oxides, as well as terpenes of various chain lengths, including monoterpenes, sesquiterpenes, diterpenes, triterpenes, and tetraterpenes.

Many terpenes occur naturally in plants as constituents of essential oils or they may form from the process of extraction (such as steam distillation, water distillation, hydro distillation or solvent extraction) of the oil from the plant material. Terpenes may be formed by further processes such as the result of oxygen or hydroxyl addition via acid hydrolysis or by air oxidation or via synthetic or natural reagents. In the additives and methods of the invention, the terpenes can be isolated from the oils in order to intensify the terpenes' effectiveness, or essential oils may be used in their whole, especially where the oils naturally contain high concentrations of terpenes.

Examples of essential oils suitable for use in the invention include: ajowan, angelica root, angelica root himalayan, angelica seed, aniseed china star, anise seed, aniseed, armoise, artemisia, asafoetida, backhousia anisata, lemon myrtle oil certified, basil, basil australian, basil sweet linalool, basil methyl chavicol, bay west indies, bergamot calabrian, bergamot ivory coast, bergamot mint, bergamot non-phototoxic, borneo camphor, buchu, cabreuva, cajeput ambon, camphor white oil, cananga, caraway, cardamon, carrot seed, carrot seed european, cassia, cedarwood atlas, cedarwood chinese, cedarwood himalayan, cedar leaf, cedarwood texas, cedarwood virginian, celery seed, chamomile german extra blue, chamomile wild moroccan, chamomile matricaria, chamomile roman, cinnamon bark, cinnamon leaf, cistus, citronella ceylon, citronella java, clary sage french, clary sage bulgarian, clary sage, clove bud, clove bud madagascar extra, clove leaf, clove stem, copaiba, coriander, cubeb, cumin, cypress provence, cypress wild, cypress white wood, dill seed, elemi, eremophila, buddawood, eucalyptus australiana, eucalyptus blue mallee bush still, eucalyptus blue gum, eucalyptus dives "c", eucalyptus radiata, eucalyptus staigeriana, everlasting oil, fennel sweet, fennel wild tasmanian, fir needle, siberian, fir needle, canada, fir needle, silver, frankincense, frankincense somalia, galbanum, garlic, geranium, geranium bourbon reunion, geranium bourbon china, geranium egyptian, ginger, ginger fresh, grapefruit australian, grapefruit pink, guaiacwood, gurjun balsam oil, ho leaf, hyssop, juniper branch, juniperberry extra, juniperberry wild himalayan, juniperberry wild tyrol, kanuka, laurel leaf, lavender, lavender french alpine, lavandin, lavender bulgarian, lavender french population, lavender true oil, lavandid absolute, lavender spike spanish, lavender tasmanian, lemon cold pressed, lemongrass cochin, lemongrass guatemalan, lemongrass nepal, lemon scented eucalyptus, lemon scented tea tree, lemon verbena genuine, lime cold pressed, lime distilled, lime west indian distilled, litsea cubeba, lovage root, mace east indian, mandarin cold pressed, mandarin australian, cold pressed, mandarin sicilian premium, manuka, marjoram majorana, marjoram spanish, melaleuca ericifolia, melissa genuine, melissa oil, melaleuca quinquenervia linalool, melaleuca quinquenervia nerolidol, myrrh, myrtle dalmation, nagarmotha, neroli bigarade, niaouli pacific islands, niaouli australian, nutmeg, olibanum, orange bitter, orange navel, orange sweet, orange valencia, origanum, palmarosa, parsley herb, parsley seed, patchouli, patchouli aceh, patchouli clear, pennyroyal, peppermint arvensis complete, peppermint australian, peppermint eucalyptus, peppermint mitcham, pepper black, peppermint yakima, peru balsam oil, petitgrain bigarade, petitgrain bigarade italian, petitgrain mandarin, petitgrain paraguay, pimento leaf, pine needle, pine extract, pine white, austrian, pinus pumilio, pinus sylvestris, rose otto bulgarian, rose otto moroc, rose otto turkish, rosemary, rosemary verbenone australian, rosemary moroccan, rosemary spanish, rosemary tunisian, rosemary verbenone oil, rosewood brazilian sustainable, sage dalmatian, sage spanish, sandalwood east indian, sandalwood west indian, sandalwood pacific islands, sandalwood west indian, sandalwood western australian, savory summer, savory winter, spearmint, spearmint premium mid west, spikenard, tagette, tagetes, tangerine, tarragon, tea tree bush still, tea tree oil certified, tea tree premium, thuja, thyme red, thyme linalool oil, thyme thymol oil, thyme wild, tocopherol alpha, turmeric, turpentine, valerian european, valerian indian, vanilla, vetiver, vetiver bourbon, vetiver haiti, vetiver java, wintergreen natural chinese, wintergreen natural gaultheria, yarrow, yarrow high chamazulene ct, ylang ylang 1st, ylang ylang 3rd, ylang ylang complete, ylang ylang extra, ylang ylang super extra.

Without wishing to be bound by any particular theory, it is believed that the odor reducing additives of the invention reduce odor by interacting with odor causing compounds in oil based media. Thus preferred additives are those that contain components capable of interacting with odor causing substances. Such components include for example: unsaturated terpenes; phenolics such as eugenol (an isolate from clove oil; this is not a terpene but is still an essential oil component) which can react for instance with acids and base derived odors; primary, secondary, and tertiary alcohols such as linalool, citronellol, terpineol and especially tertiary alcohols, which can form odor reactive carbocations; oxides, such as 1,4 cineole, 1,8 cineole, and linalool oxide; ketones such as camphor, a common constituent of essential oils like Rosemary and Sage oil or it may be manufactured as a derivative of turpentine oil.

Odor reducing additives can also be selected for a particular application based on the ability of the components in the additive to dissolve or bind odorous compounds. Since, as is well known, like dissolves like, essential oil components can be selected according to their similarity in structure to the odor to be reduced or eliminated. For example, if the odor is a hydrocarbon, then a hydrocarbon terpene, such as α-pinene, β-pinene, δ-3 carene, or dipentene, or mixtures thereof is preferred. If the odor is styrene, then terpenes such as p-cymene or p- cymenene are preferred for treating this odor. Similarly, essential oil components that reduce odors such as ammonia, sulfur and mercaptans can be readily selected. Where a broad spectrum of odors is to be treated, a broad-spectrum mix of essential oils and/or essential oil components can be used, thus combining the reactivity of a number of components.

One preferred odor reducing additive is a broad spectrum mixture of components and/or essential oils and includes:

| Oil/terpene | Concentration range (%) |
| --- | --- |
| Rosemary oil | 10-20 |
| Cedarwood oil | 8-12 |
| Pine Needle oil | 20-30 |
| Eucalyptus oil | 10-20 |
| Clove oil | 5-10 |
| Thyme oil | 8-12 |
| Vetiver oil | 1-6 |
| Vanilla oleoresin | 1-6 |
| Lavender oil | 5-10 |
| Tea Tree oil | 3-7 |

Another preferred odor reducing additive includes:

| Oil/terpene | Concentration range (%) |
| --- | --- |
| α-pinene | 2-7 |
| β-pinene | 2-7 |
| d 3 carene | 2-7 |
| dipentene | 15-25 |
| p-cymene | 5-15 |
| cineole | 5-15 |
| camphor | 10-20 |
| terpineol | 7-13 |
| bornyl acetate | 2-6 |
| cedrene | 2-6 |
| cedrol | 5-10 |
| thymol | 2-16 |

Another preferred odor reducing additive that is especially useful for reducing or eliminating hydrocarbon odors is one or more terpenes, selected from d-limonene, 1-limonene, d1-limonene, pinene, carene, terpinolene, camphene, myrcene, and sabinene, or essential oils containing such terpenes such as Eucalyptus, Pine, Pine needle, Turpentine, or mixtures thereof.

Another preferred odor reducing additive comprises as primary constituents: (+) limonene, pine extract and pine white oil, pinus sylvestris oil, anise seed oil, and clove bud oil. The additive may contain additional miscellaneous oils including aniseed oil, camphor white oil, cedarwood atlas oil, cedarwood texas oil, cedarwood virginia oil, lavandin absolute, lime distilled oil, olibanum extract, rosemary oil, sandlewood west indian oil, tocopherol alpha, and vanilla. Preferably, these components are present at a volume ratio of about 35-45% of (+) limonene, about 25-35% of pine extract and pine white oil, about 1-5% pinus sylvestris oil, about 3-8% anise seed oil, about 3-8% clove bud oil and about 20-25% miscellaneous oils. This additive is preferred for reducing odor where the oil based medium is liquid asphalt cement.

For effective odor treatment, the amount of odor reducing additive that is added to oil based media will depend on several factors including whether isolated essential oil components or essential oils are used, the concentration of components in the essential oils, the quantity of volatiles in the oil based media that cause the odor, and the cost of the particular component(s) or essential oil(s). As a general guideline, it is preferred that about 0.0001 to about 10%, more preferably about 0.0003% to about 3%, by volume, of odor reducing additive is used, relative to the volume amount of oil based media.

The odor reducing additive can be added directly to an odor producing oil based medium, or it can be diluted with a carrier oil. Dilution with a carrier oil is especially useful where only a very small amount of additive is required to reduce odor, thereby facilitating handling of the additive. Dilution with a carrier oil can also help dissolve or disperse the additive in the oil based medium. Suitable carrier oils include, for instance, mineral oil, vegetable oil, fatty acid alkyl esters, or mixtures thereof.

A preferred carrier oil is fatty acid alkyl esters or mixtures of fatty acid alkyl esters. Preferably, the fatty component of the fatty acid ester is linear or branched $C_8$-$C_{20}$ alkyl. Preferably the alkyl component of the fatty acid ester is linear or branched $C_1$-$C_6$ alkyl. Preferred carrier oils includes fatty acid methyl ester(s) and fatty acid ethyl esters. Preferred oils also include methyl and ethyl esters of palm, coconut, canola, peanut, sunflower, and safflower oils. Another preferred carrier oil is SOYGOLD® 1000, which contains alkyl $C_{16}$-$C_{18}$ methyl esters, and is a methyl ester of soybean oil. SOYGOLD® 1000 is available from AG Environmental Products L.L.C., Lenexa, Kans.

When diluted with a carrier oil, it is preferred that the ratio of odor reducing additive to carrier oil is about 1-50% by volume of odor reducing additive and about 50-99% by volume of carrier oil.

Oil based media with which the odor reducing additives of the invention can be used include all oil based media that produce odors. Examples of such media include, but are not limited to, wax based products such as candles, resins, fuel oil, waste oil fuel oil, synthetic lubricants, rubber, liquid asphalt cement, and hot mix asphalt. Preferred oil based media include wax based products, liquid asphalt cement, hot mix asphalt and waste oil fuel oil.

When added to wax based products, such as candles, the odor reducing additives of the invention function to reduce or eliminate odors in the area surrounding the location where the candle is being burned. Thus, burning of a candle containing the odor reducing additive of the invention reduces odors in the surroundings of the candle. It is preferred that the odor reducing additive is diluted with carrier oil prior to addition of the additive to the wax. Preferably, the ratio is about 35 to about 45 volume % of additive to about 55-65% by weight of carrier oil. Preferably, the total amount of odor reducing additive and carrier oil that is mixed with the wax is about 10 to about 15% based on the volume of the wax.

As indicated above, another preferred oil based medium is hot mix asphalt. Generally, hot mix asphalt contains at least two major components; liquid asphalt cement ("liquid AC," also known as "binder") and aggregates. The liquid AC functions to coat and bind together the aggregate particles. The aggregates provide stability and strength to the asphalt mixture. Aggregates can be, for example, crushed rock, fillers, gravel, stone, quarry gravel and recycled paving material.

It is preferred that the odor reducing additive used with hot mix asphalt is first diluted with a carrier oil, such as fatty acid alkyl esters, prior to addition to the asphalt. Preferably, the ratio of additive to carrier oil is about 1-5% by volume of additive to about 95-99% by volume of carrier oil.

Preferably, the diluted additive is mixed with the liquid AC prior to mixing of the liquid AC with the aggregates. Thus, for example, the diluted additive is mixed with the liquid AC during or after refinement of the liquid AC from crude oil, or at a liquid AC terminal, or at a hotmix asphalt plant prior to mixing of the liquid AC with aggregates.

For effective odor reduction, it is preferred that the ratio of the total amount of odor reducing additive and carrier oil that is mixed with the liquid AC is about 0.001 to about 0.05% of additive and carrier oil to about 99.999-99.95% by volume of liquid AC. More preferably, the ratio is about 0.007-0.03% of additive and carrier oil to about 99.993-99.97% by volume of liquid AC. Even more preferably, the ratio is about 0.009-0.02% of additive and carrier oil to about 99.991-99.98% by volume of liquid AC.

The following examples are illustrative of the invention, but do not serve to limit its scope.

EXAMPLES

The examples demonstrate the capability of the odor reducing additives of the invention to reduce odor of asphalt. In these examples, odor reducing additives were mixed with asphalt in sealed vials. The headspace of the sealed vials was evaluated by gas chromatography/mass spectroscopy (GC/MS). GC/MS data indicated that the headspace of asphalt samples containing odor reducing additives contained reduced amounts of oil volatiles compared to the headspace of asphalt samples not containing odor reducing additives.

General Provisions

Instrumentation: HP 5890 gas chromatograph attached to an HP 5970 MSD
  Inject temperature 250° C.
  Detector temperature 280° C.
  Oven Equilibrium time 0.50 minutes
  Initial temperature 70° C.
  Initial time 2.00 minutes
  Change level 1 to level 2 20° C./min
  Final temperature 210° C.
  Transfer line temperature 300° C.

Odor reducing additive X contains Thyme, Cinnamon, Pine Needle, Pine wood, Aniseed, Lemon, the reaction product of turpentine oil and acid and subsequent fractionation, and orange oil. The additive is diluted with carrier oil at a volume ratio of about 3% additive to about 97% of carrier oil.

Odor reducing additive Y contains (+) limonene, pine extract, pine white oil, pinus sylvestris oil, anise seed oil, clove bud oil and other miscellaneous oils. The additive is diluted with carrier oil at a volume ratio of about 3% additive to about 97% of carrier oil.

Example 1

Asphalt samples, labeled PG70-22 and 64-22, were heated until they became a viscous liquid. Approximately 5.0 g of each of the two asphalt samples were added to separate 20 mL vials. Vials were labeled 6422-1, 6422-2, 6422-3, 7022-1, 7022-2 and 7022-3. Vials were allowed to come to room temperature. One µL of odor reducing additive X was added to each of the 6422-2 and 7022-2 vials. One µL of odor reducing additive Y was added to each of the 6422-3 and 7022-3 vials. Individual vials, crimped shut using Teflon faced septa and aluminum seals, were placed in a Fisher forced air oven and heated at 151° C. for 30 minutes after which 1 mL of headspace of each vial was injected into a GC/MS system. A blank consisting of an empty crimped vial was also analyzed using identical procedures.

Figure 1:
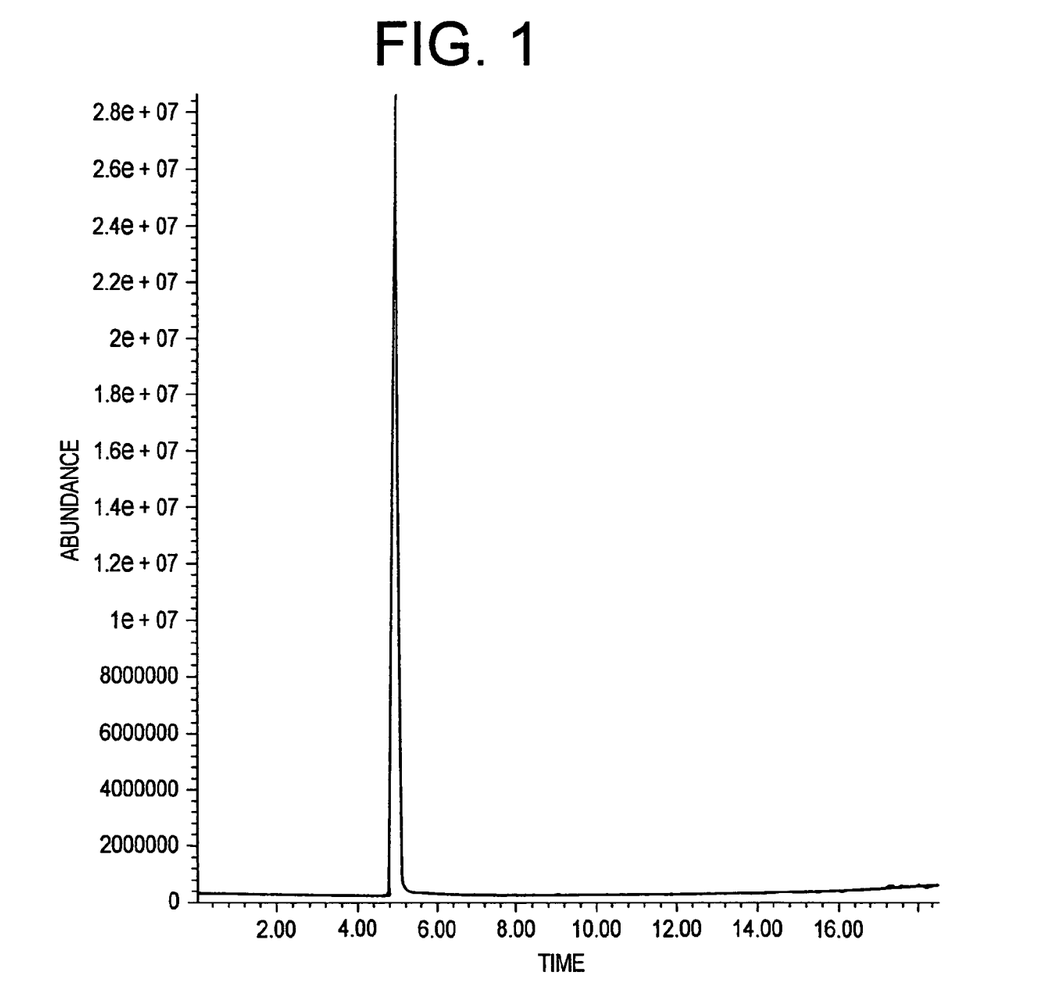
FIG. 1 is a GC trace of a blank sample showing a volatile substance given off by septa when heated to 151° C.

A large peak was found at a retention time of 4.7 minutes (FIG. 1). This substance, also found in the blank, was found to be a volatile substance given off by septa when heated to 151° C. and the Teflon face penetrated by the injection needle.

Figure 2:
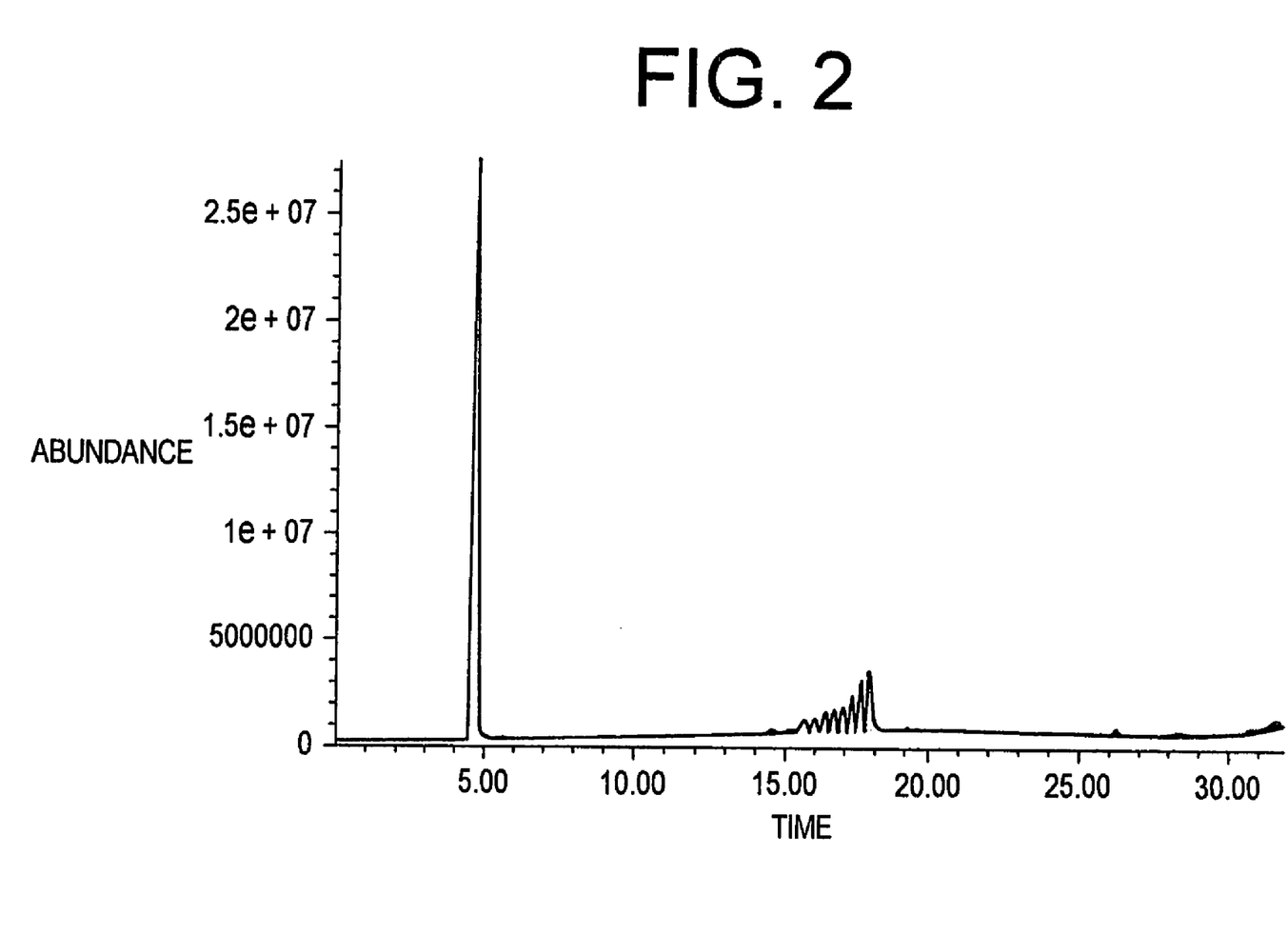
FIGS. 2, and 3 are GC traces of the headspace above an asphalt sample.
Figure 3:
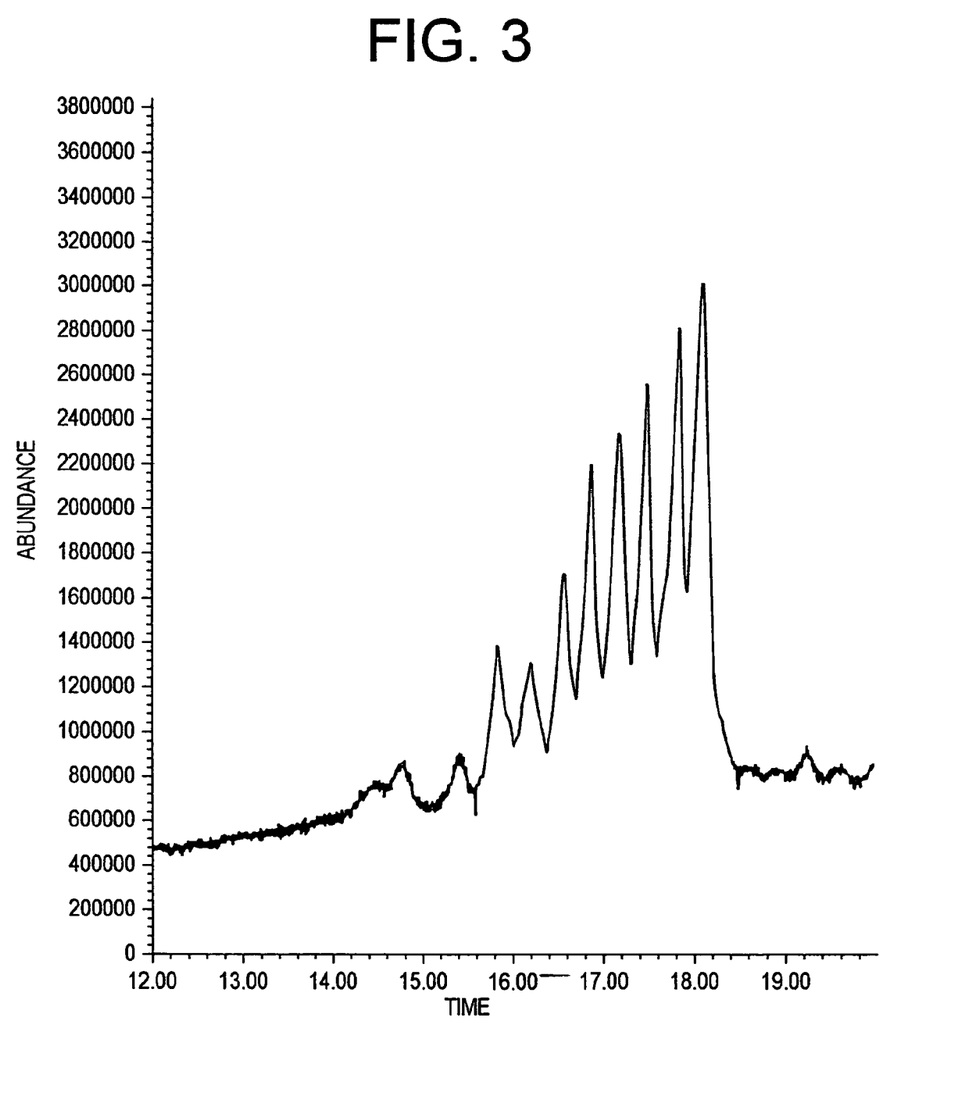

Asphalt sample 6422 in addition to the 4.7 peak, produced a series of increasing molecular weight hydrocarbon components with retention times similar to a fractional distillation pattern (FIGS. 2 and 3). Eight of the major peaks were selected; their integrated areas obtained and corrected areas calculated by normalizing factor needed to adjust all sample sizes to a value of 5.0 g. An average normalized total peak area equaled 14,266+/−5% counts.

Vial 6422-1 had an average normalized total peak area of 14,266+/−5% counts.

Figure 4:
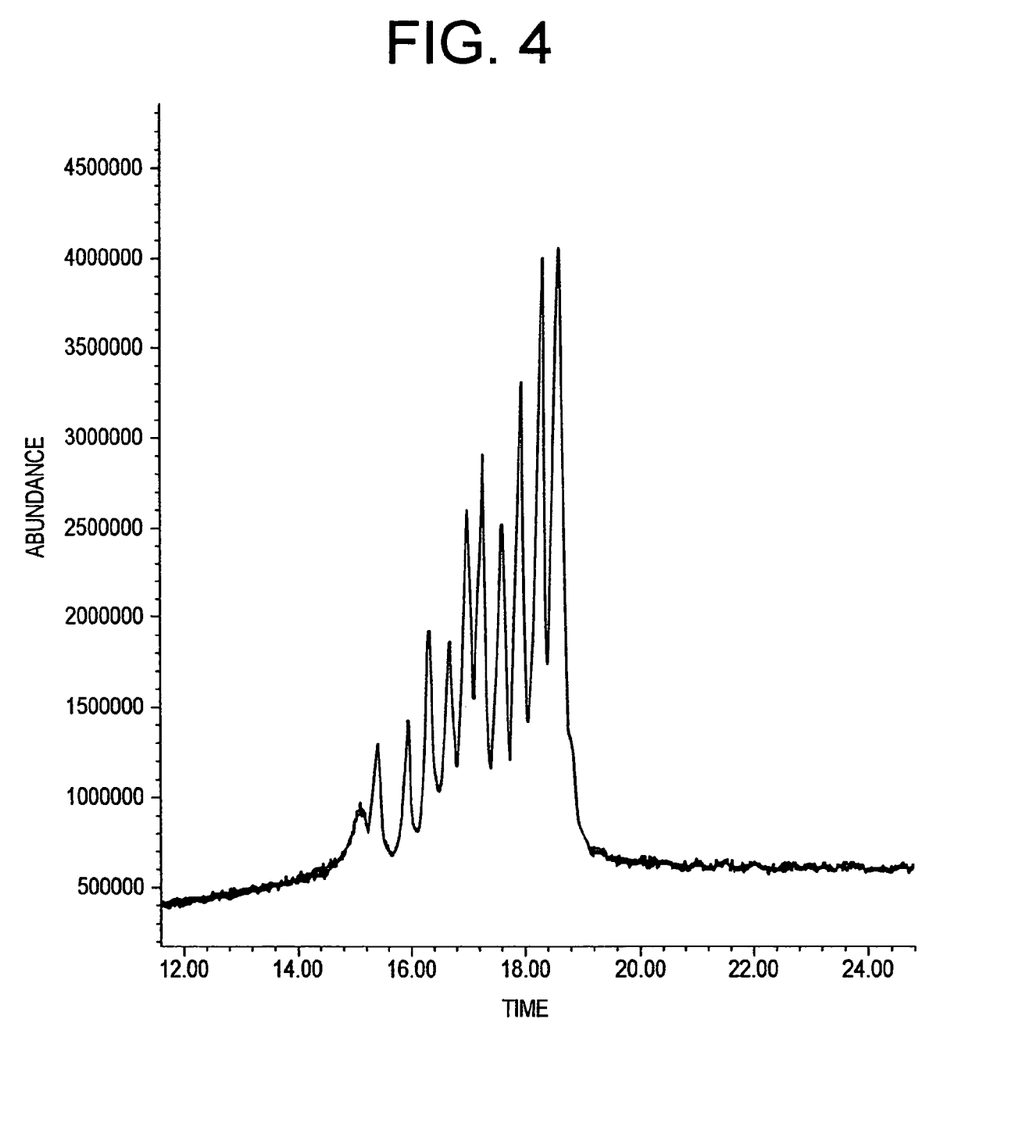
FIG. 4 is a GC trace of the headspace above an asphalt sample containing an odor reducing additive.

Vial 6422-2 (containing 1 µL of X oil) had an average normalized total peak area of 14,735+/−5% counts (FIG. 4).

Figure 5:
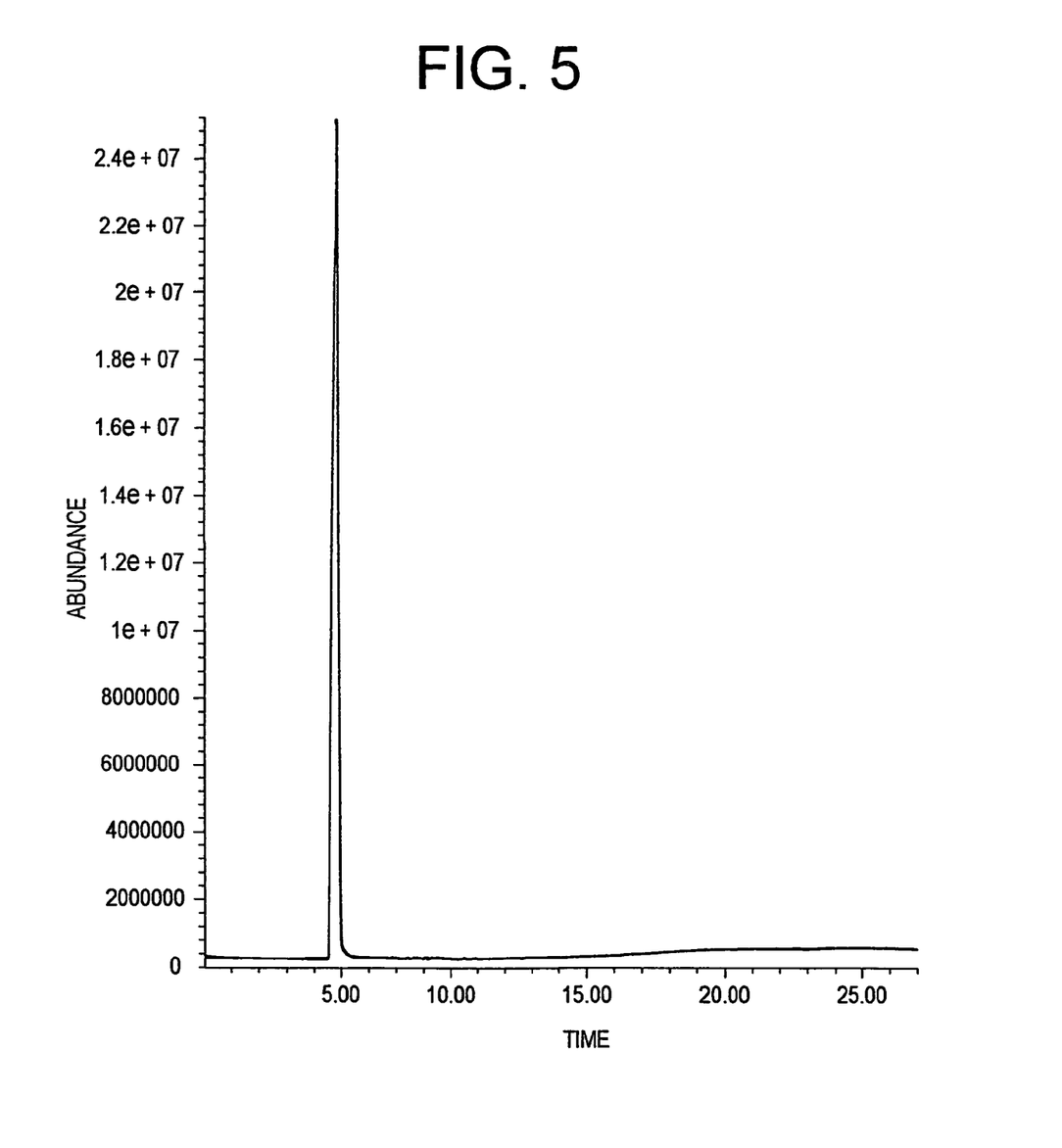
FIG. 5 is a GC trace of the headspace above an asphalt sample containing an odor reducing additive.

Vial 6422-3 (containing 1 µL of Y oil) produced no detectable hydrocarbon peaks (FIG. 5). Three aliquot samples of 6422-3 were run with identical results. (Minimum detection limit was approximately 500 counts).

Figure 6:
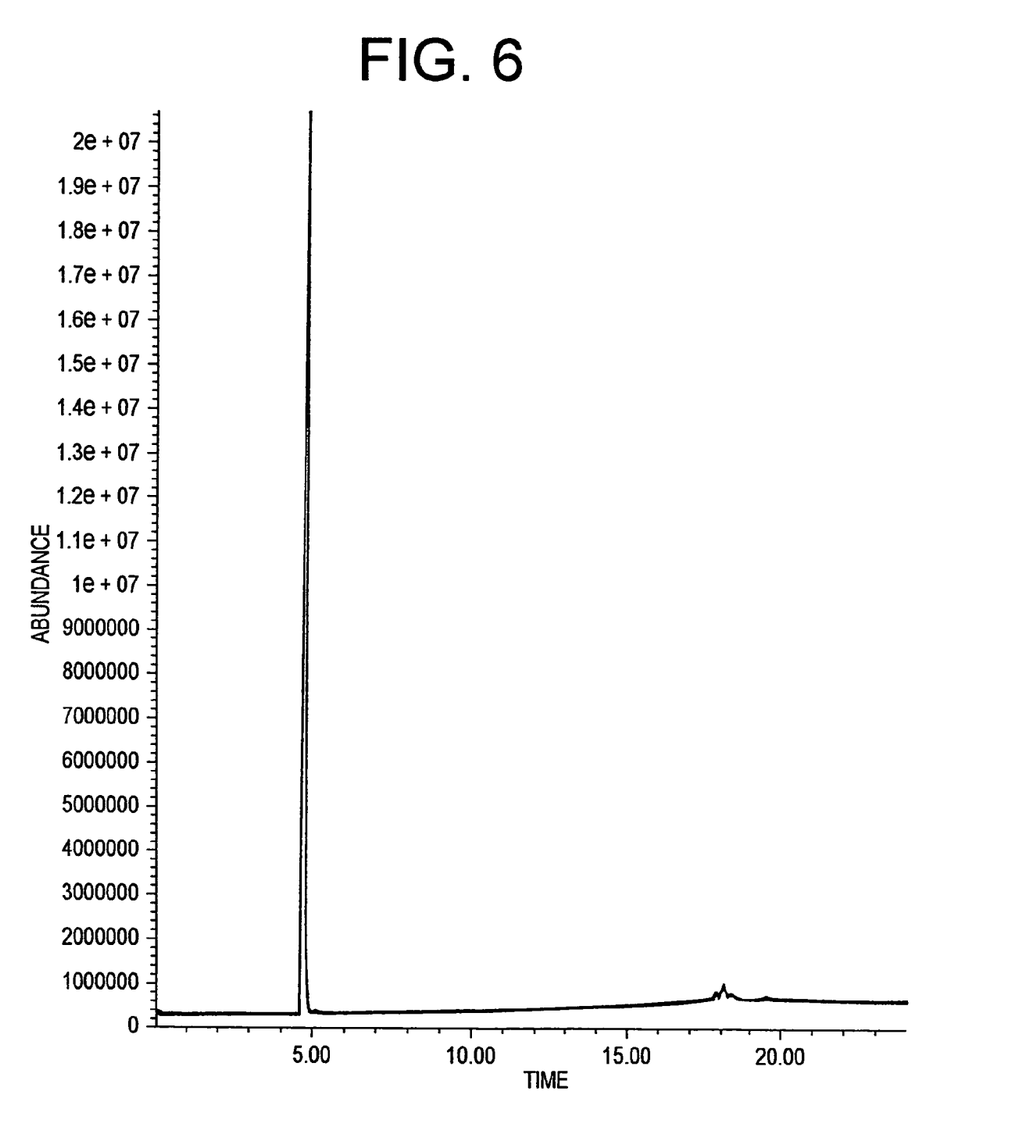
FIG. 6 is a GC trace of the headspace above an asphalt sample.

Vial 7022-1 had an average normalized total peak area of 1494+/−5% counts. (FIG. 6).

Figure 7:
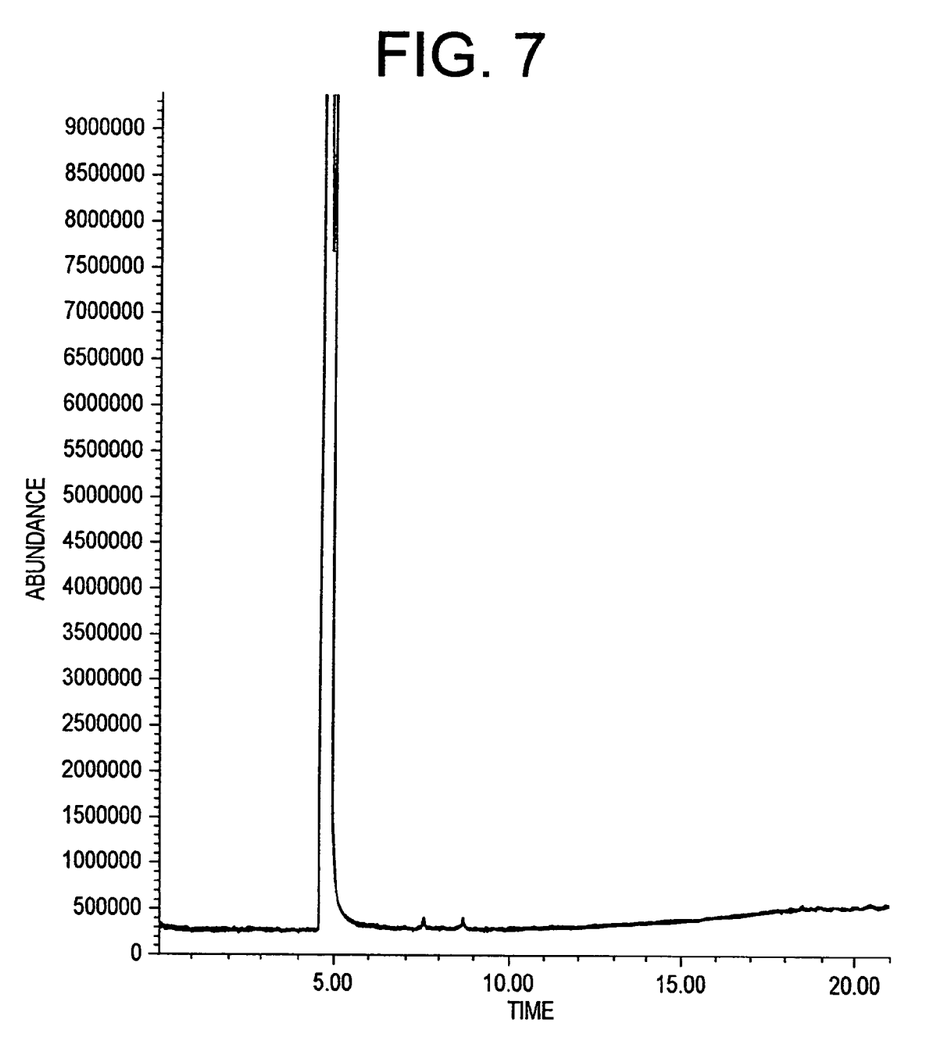
FIG. 7 is a GC trace of the headspace above an asphalt sample containing an odor reducing additive.

Vial 7022-2 (containing 1 µL of X oil) produced no detectable hydrocarbon peaks. (FIG. 7). Three aliquot samples of 7022-2 were run with identical results. (Minimum detection limit was approximately 500 counts).

Figure 8:
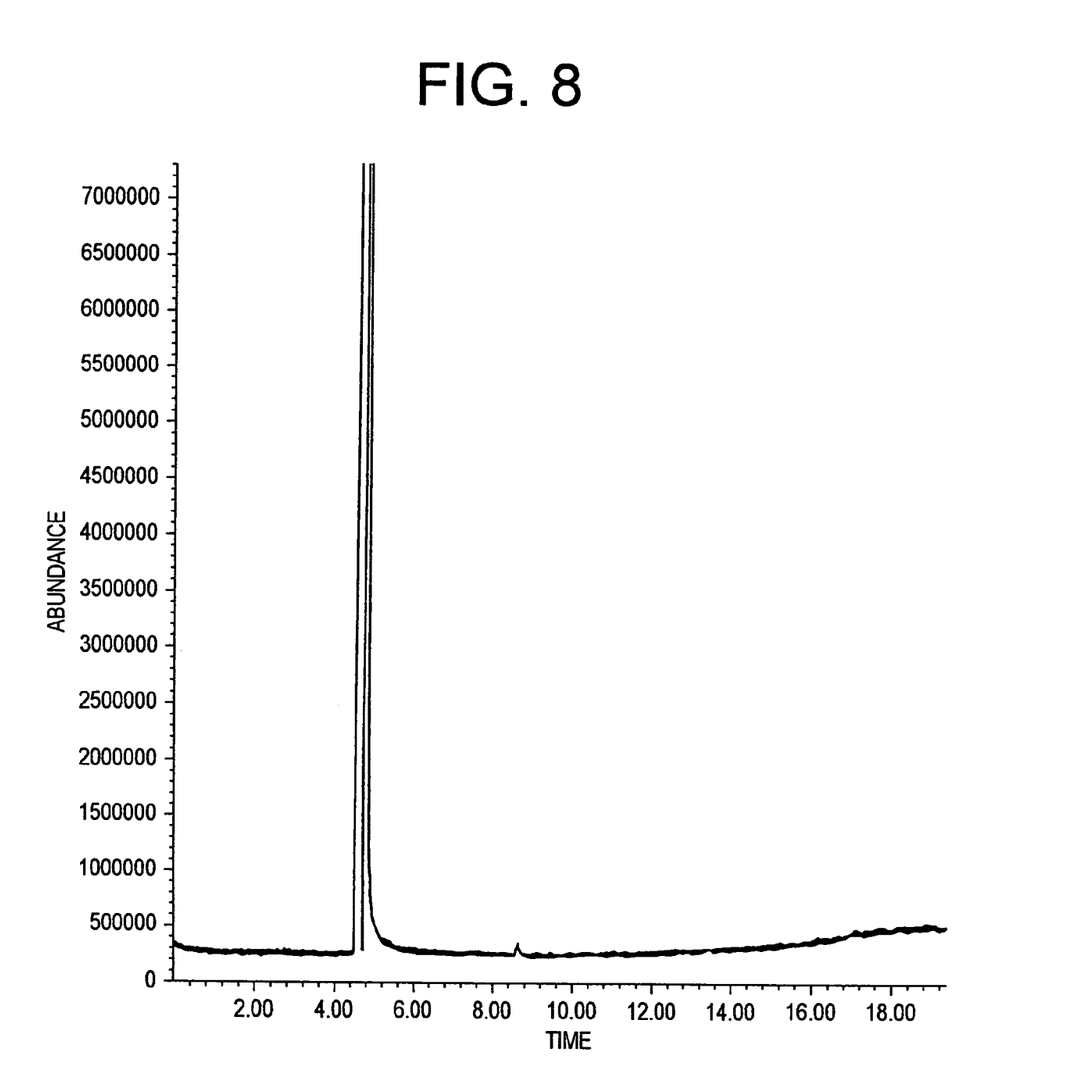
FIG. 8 is a GC trace of the headspace above an asphalt sample containing an odor reducing additive.

Vial 7022-3 (containing 1 µL of Y oil) produced no detectable hydrocarbon peaks (FIG. 8). Three aliquot samples of 7022-3 were run with identical results. (Minimum detection limit was approximately 500 counts).

These data show that the combination of essential oils and methyl ester of soybean oils in the additive samples tested are useful at reducing odor.

What is claimed is:

1. A method for reducing odor in oil based media, said method comprising mixing an odor reducing amount of an odor reducing additive with an oil based medium, wherein the odor reducing additive is a mixture of essential oils, a mixture of essential oil components, or mixtures thereof, wherein the odor reducing additive is diluted with a carrier oil, which is comprised of methyl esters of canola oil, ethyl esters of canola oil, the methyl ester of soybean oil, or a mixture thereof; and wherein the oil based medium is fuel oil, waste oil fuel oil, oil based synthetic lubricants, liquid asphalt cement, or hot mix asphalt.

2. The method of claim 1 wherein the odor reducing additive comprises one or more essential oils selected from the group consisting of Rosemary oil, Cedarwood oil, Pine Needle oil, Eucalyptus oil, Clove oil, Thyme oil, Vetiver oil, Vanilla oleo resin, Lavender oil, and Tea Tree oil.

3. The method of claim 1 wherein the odor reducing additive comprises one or more terpenes selected from the group consisting of α-pinene, β-pinene, d 3 carene, dipentene, p-cymene, cineole, camphor, terpineol, bomyl acetate, cedrene, cedrol, and thymol.

4. The method of claim 1 wherein the odor reducing additive comprises (+) limonene, pine extract and pine white oil, pinus sylvestris oil, anise seed oil, and clove bud oil.

5. The method of claim 4 wherein the odor reducing additive further comprises aniseed oil, camphor white oil, cedarwood atlas oil, cedarwood texas oil, cedarwood virginia oil, lavandin absolute, lime distilled oil, olibanum extract, rosemary oil, sandlewood west indian oil, tocopherol alpha, and vanilla.

6. A method according to claim 1, wherein the odor reducing additive contains limonene.

7. A mixture having reduced odor comprising: an oil based medium; and an odor reducing additive, wherein the odor reducing additive is a mixture of essential oils, a mixture of essential oil components, or mixtures thereof, wherein the odor reducing additive is diluted with a carrier oil, which is comprised of methyl esters of canola oil, ethyl esters of canola oil, the methyl ester of soybean oil, or a mixture thereof; and wherein the oil based medium is fuel oil, waste oil fuel oil, oil based synthetic lubricants, liquid asphalt cement, or hot mix asphalt.

8. The mixture of claim 7 wherein the odor reducing additive comprises one or more essential oils selected from the group consisting of Rosemary oil, Cedarwood oil, Pine Needle oil, Eucalyptus oil, Clove oil, Thyme oil, Vetiver oil, Vanilla oleo resin, Lavender oil, and Tea Tree oil.

9. The mixture of claim 7 wherein the odor reducing additive comprises one or more terpenes selected from the group consisting of .alpha.-pinene, .beta.-pinene, d 3 carene, dipentene, p-cymene, cineole, camphor, terpineol, bomyl acetate, cedrene, cedrol, and thymol.

10. The mixture of claim 7 wherein the odor reducing additive comprises (+) limonene, pine extract and pine white oil, pinus sylvestris oil, anise seed oil, and clove bud oil.

11. The mixture of claim 10 wherein the odor reducing additive further comprises aniseed oil, camphor white oil, cedarwood atlas oil, cedarwood texas oil, cedarwood virginia oil, lavandin absolute, lime distilled oil, olibanum extract, rosemary oil, sandlewood west indian oil, tocopherol alpha, and vanilla.

12. The mixture of claim 7 wherein the carrier oil is methyl esters of canola oil, the methyl ester of soybean oil, or a mixture thereof.

13. The mixture of claim 7 wherein the oil based medium is waste oil fuel oil.

14. The mixture of claim 13, wherein the odor reducing additive contains limonene.

15. The mixture of claim 7 wherein the oil based medium is liquid asphalt cement.

16. The mixture of claim 15 further comprising an aggregate.

17. The mixture of claim 16 wherein the aggregate is selected from the group consisting of crushed rock, fillers, gravel, stone, quarry gravel and recycled paving material.

18. The mixture of claim 7, wherein the odor reducing additive contains limonene.

* * * * *